United States Patent [19]

Bacher

[11] 3,854,858

[45] Dec. 17, 1974

[54] ARRANGEMENT FOR PROCESSING BANDS OF SYNTHETIC MATERIAL IN DEFORMABLE STATE

[75] Inventor: Helmet Bacher, Neugermering, Germany

[73] Assignee: Krauss-Maffie Aktiengesellschaft, Munich, Germany

[22] Filed: Jan. 26, 1973

[21] Appl. No.: 327,218

[30] Foreign Application Priority Data

Jan. 29, 1972 Germany.............................. 2204215

[52] U.S. Cl.................. 425/367, 425/168, 425/394, 74/840
[51] Int. Cl........................................... B29c 15/00
[58] Field of Search .......... 425/363, 369, 394, 409, 425/385, 367, 168; 74/840, 84, 112, 113

[56] References Cited
UNITED STATES PATENTS

| | | | |
|---|---|---|---|
| 185,978 | 1/1877 | Staples............................. | 425/363 |
| 1,891,845 | 12/1932 | Spitz et al........................ | 425/363 X |
| 2,053,758 | 9/1936 | Zschernitz....................... | 425/369 X |
| 2,769,408 | 11/1956 | Rhodes............................ | 425/363 |

*Primary Examiner*—Robert L. Spicer, Jr.
*Attorney, Agent, or Firm*—Michael S. Striker

[57] ABSTRACT

A pair of cooperating rollers are mounted for rotation about parallel axes; their circumferential surfaces define with one another a gap through which the bands to be processed are passed. At least one of the rollers is driven in rotation and an arrangement is provided for periodically varying the width of the gap. The arrangement has a shaft which extends through one of the rollers and is mounted for eccentric rotation and a cam which controls the periodicity of the eccentric rotation.

7 Claims, 1 Drawing Figure

PATENTED DEC 17 1974 3,854,858
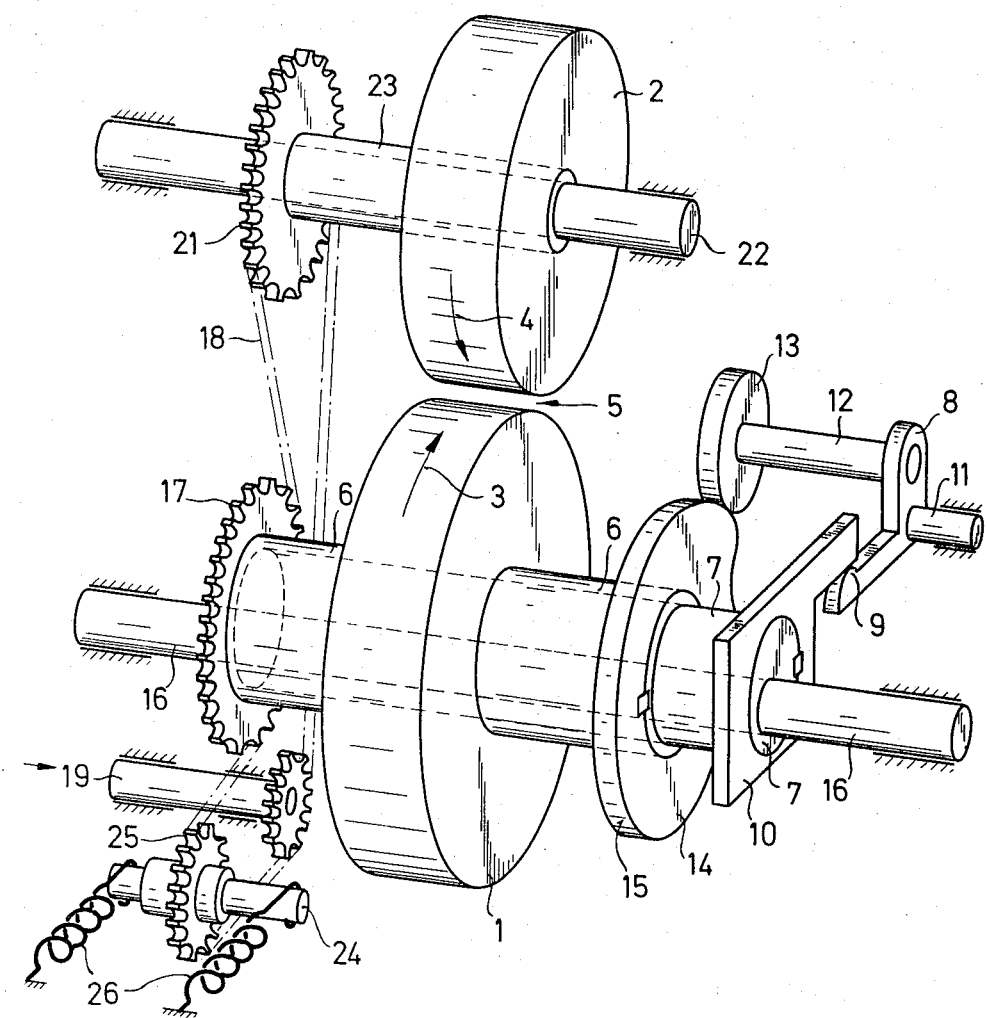

ARRANGEMENT FOR PROCESSING BANDS OF SYNTHETIC MATERIAL IN DEFORMABLE STATE

BACKGROUND OF THE INVENTION

The present invention relates to an arrangement for processing bands of synthetic plastic material in deformable state.

There are instances where it is necessary to process bands of synthetic plastic material which are in deformable state, by giving them different thicknesses at different points. For instance this is true in the case of intermediate layers of skiis of synthetic plastic material, where each section of the layer must have a greater thickness at the middle than towards the ends of the section than towards the ends of the ski.

The problem has already been recognized and an attempt has been made to solve it utilizing a roller which coacts with a belt conveyor, defining therewith a gap through which the resinous synthetic plastic material band is passed. The spacing of the gap is periodically altered in order to change the thickness of the band passing through the gap. This is accomplished by mounting the roller on the end of a long arm which is pivotable and is mounted for such pivoting movement on an axis which approximately intersects the arms midway between the ends thereof, whereas the free end remote from the end carrying the roller is acted upon by a cam controlling the periodic variation of the gap. The operation of this construction is generally satisfactory, but certain disadvantages exist nevertheless. In particular, the length of the arm required for mounting of the roller makes for a rather bulky construction and, in view of the forces which must be applied for profiling the resinous synthetic plastic band, the construction must be very solid and strong. This is undesirable from the point of view of the expenses involved in constructing the device, just as the bulk of the device is undesirable in view of the frequently existing space limitations. In addition, the particular construction here under discussion cannot permit for a ready removal of the roller for repair or other purposes, or for the cam track associated with the roller.

SUMMARY OF THE INVENTION

It is, accordingly, a general object of the present invention to avoid the aforementioned disadvantages.

More particularly it is an object of the present invention to provide an arrangement of the type here in question which is not possessed of these disadvantages.

Still more particularly it is an object of the invention to provide such an arrangement which is of compact, space-saving construction.

Another object of the invention is to provide an arrangement of the type in question which is of relatively light construction and thus less expensive to produce than what is known from the art.

A further object of the invention is to provide such an arrangement in which the various components can be readily removed or exchanged.

In keeping with these objects and others which will become apparent hereafter, one feature of the invention resides in an arrangement for processing bands of synthetic plastic material in deformable state, such arrangement comprising a pair of cooperating rollers mounted for rotation about at least substantially parallel axes and having respective circumferential surfaces defining with one another a gap through which the bands are to pass. Drive means is provided for driving at least one of these rollers in rotation, and varying means is provided for periodically varying the width of the gap. The varying means includes a shaft extending through one of the rollers mounted for rotation about the axis associated with this one roller in an eccentric manner, and cam means operative for controlling the periodicity of such eccentric rotation.

The construction according to the present invention requires much less space than what is known from the art, due to the fact that the eccentric shaft, that is the shaft mounted for eccentric rotation, extends through the roller which is to perform movements varying the width of the gap, and due to the fact that the cam controlling the periodicity of the movement is no longer arranged as in the prior art.

Aside from the space-saving construction of the present invention, the arrangement according to the invention also substantially shortens the lever arm which participates in the transmission of forces so that the forces which are required are lower than heretofore necessary. This, incidentally, makes for an improved control of the variation in the width of the gap.

Another advantage of the invention results from the fact that components which must be made readily accessible and exchangeable, to permit the processing of the bands of different types or dimensions, are now available without any difficulty, so that they can be readily removed and replaced. This is for instance true of the movable roller which in some instances is provided with a profiling that is to be imparted to the band of synthetic plastic material, and which may have to vary from time to time depending upon the particular profiling which is to be imparted to a band for a particular purpose.

Advantageously the shaft which is mounted for eccentric rotation will be connected with the lever a free end of which engages in the direction of rotation of the shaft a cam arm which in turn is pivotable about an axis. This is a particularly simple arrangement for effecting displacement of the shaft.

It is also advantageous if the cam disk itself is fixedly connected with the eccentric shaft, advantageously via a hollow shaft, and if it controls a follower roller which is so mounted on the aforementioned cam arm that the axis of the follower roller forms with the pivot point of the cam arm a lever arm. With such an arrangement it is assured that all components necessary for controlling the movement of the eccentric shaft, as well as the eccentric shaft itself, are located within a very small volume of space. In addition, all components which must be changed if for instance a difference in the thickness and in the ratio of thick to thin portions of the bands is desired, namely the shaft, the eccentric roller which it controls and which is the roller that moves to vary the gap, and the cam disk itself, are directly connected with one another and can be installed and removed in a very simple operation. This is particularly easy if the eccentric shaft is mounted on a stub shaft which can be readily removed from the journals which engage its ends. In this case the components which must be capable of exchange can undergo such exchange simply by removing the stub shaft from its journals and then removing the components in question. To reverse the operation, it is merely necessary to reverse the sequence of events.

It is advantageous if the drive is effected via a belt or chain drive which may drive one or both rollers and which is advantageously provided with a tensioning arrangement maintaining the belt or chain tight in all operating conditions.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

The single FIGURE is a somewhat diagrammatic perspective view illustrating an embodiment of the invention.

DESCRIPTION OF THE PREFERRED EMBODIMENTS

Discussing now the drawing in detail, it is first emphasized that any components not essential for an understanding of the invention have been omitted for the sake of clarity.

It will be seen that reference numeral 1 identifies a lower of two rollers, the upper one being identified with reference numeral 2. The lower roller is the eccentric roller, that is the roller which moves to vary the width of a gap 5 defined between the circumferential surfaces of the two rollers and through which bands of synthetic plastic resin material in deformable state are passed. The rollers rotate in the direction of the arrows 3 and 4, respectively, that is in mutually opposite directions, and the bands to be processed may be supplied from various sources of supply, for instance from an extruder the outlet of which is located immediately adjacent to and upstream of the gap 5.

It is intended for such a band of synthetic plastic material to be produced continuously and to vary the thickness of the band at regular intervals. For this reason it is necessary that the width of the gap 5 be periodically changed in order to thereby profile the band, that is to change the thickness of the band which is being squeezed in the gap. This is achieved with the arrangement according to the present invention, and in particular with an arrangement for changing the center axis of the roller 1 so that during each rotation of the roller 1 a desired periodicity in the spatial location of the center axis of the latter is obtained, to thereby achieve the desired periodically recurring thickness variation in the band of synthetic plastic material.

The drawing shows that the roller 1 is mounted on a hollow shaft 6 which in turn surrounds a circular eccentric shaft 7 which in operation is subject to an eccentric movement, cause by its rotation about the stub shaft 16 which is journalled at its opposite ends as illustrated and which extends eccentrically through the shaft 7.

The eccentric movement of the eccentric shaft 7 is controlled by the movement of a cam lever 8 the cam 9 of which is engaged by an arm 10 which is fixedly connected with the eccentric shaft 7 and which engages the cam 9 from above and in the direction of rotation of the shaft 7. The lever 8 is mounted for pivoting movement about a stationary axis 11 and spaced from this axis it is provided with a further axis 12 on the free end of which there is mounted a follower roller 13. A cam track 14 is fixedly connected with the hollow shaft 6 and is so arranged and constructed that its outer cam track contour 15 will be engaged by the follower roller 13. This means that the movement of the axis 12 is transmitted to the lever 8 and from there to the arm 10, whereby the periodic displacement in the position of the eccentric shaft 7 is obtained.

A drive wheel, here shown as a chain sprocket 17, is also mounted on the hollow shaft 6. A further chain sprocket 20 is mounted on a shaft 19 and a drive chain 18 is trained about the sprocket 20 and about part of the circumference of the sprocket 17. In addition, the drive chain 18 drives the shaft 2 via a further chain sprocket 21 and a hollow shaft 23 mounted on an axis 22. It will be appreciated that instead of the chain sprockets and the drive chain it will be possible to use pulleys and a drive belt, for example.

It is clear from the drawing that the chain sprocket 17 will periodically change its position, that is the center of its axis of rotation will change in space periodically in keeping with the periodic changes in the width of the gap 5. This of course will result in periodic slackening of the chain 18 and it is therefore advisable to provide a chain-tensioning device which in the illustrated embodiment is in form of a sprocket wheel 25 mounted on a shaft 24 and about which the chain is trained, and springs 26 which permanently tend to displace the chain 24 downwardly in the drawing to thereby always maintain the chain 18 under a certain tension.

The desired ready exchangeability of certain components is achieved with the present invention. The drawing will show that the roller 1, the cam track 14 and the sprocket wheel 17, together with the hollow shaft 6, constitute a single unit which can be readily removed for inspection or replacement, simply by withdrawing the stub shaft 16. Evidently, it is possible to replace the entire unit by another one as circumstances may dictate, or to replace individual components of the unit. In either case the necessary changes can be carried out very readily and it is a simple manner to accommodate the particular cam disk 14 and the chain sprocket 17 to the desired or required dimensions of the bands to be processed.

If desired, one or both of the rollers 1 and 2 can be configurated as a profiled roller, that is, it can have a raised or depressed profile on its circumferential surface. Generally speaking, such profile would—if it is used at all—be provided on the roller 1, but this is of no consequence for the concept and purposes of the present invention.

It will be understood that each of the elements described above, or two or more together, may also find a useful application in other types of constructions differing from the types described above.

While the invention has been illustrated and described as embodied in an arrangement for processing bands of synthetic plastic material, it is not intended to be limited to the details shown, since various modifications and structural changes may be made without departing in any way from the spirit and concept of the present invention.

Without further analysis, the foregoing will so fully reveal the gist of the present invention that others can by applying current knowledge readily adapt it for various applications without omitting essential characteristics of the generic or specific aspects of the invention and, therefore, such adaptations and modifications should and are intended to be comprehended within the meaning and range of equivalence of the following claims.

What is claimed as new and desired to be protected by Letters Patent is set forth in the appended claims:

1. An arrangement for processing bands of synthetic plastic material in deformable state, comprising a pair of cooperating rollers mounted for rotation about at least substantially parallel axes and having respective circumferential surfaces defining with one another a gap through which the bands are to pass; drive means for driving at least one of said rollers in rotation; and varying means for periodically varying the width of said gap, including a shaft extending through one of said rollers and mounted for eccentric movement relative to the axis associated with said one roller, and cam means including a cam arm mounted laterally of said shaft for pivoting movement about a pivot axis, for controlling the periodicity of such eccentric movement, and a lever mounted on and projecting laterally from said shaft and engaging said arm from above and in direction of rotation of said shaft.

2. An arrangement as defined in claim 1, said cam track means further comprising a cam disk mounted on said shaft for rotation with the same, and a follower roller in engagement with said cam disk and mounted on said cam arm laterally offset from said pivot axis so as to define with the latter one arm of a double-armed lever whose other arm is formed by said cam arm.

3. An arrangement as defined in claim 2, said drive means comprising a chain drive including a drive sprocket, a driven sprocket on said shaft, a chain trained about said sprockets, and tensioning means for maintaining said chain tensioned irrespective of the width of said gap.

4. An arrangement as defined in claim 3, said drive means comprising a belt including a drive sprocket, a driven sprocket on said shaft, a belt trained about said sprockets, and tensioning means for maintaining said belt tensioned irrespective of the width of said gap.

5. An arrangement as defined in claim 2, said drive means comprising a drive sprocket, a driven sprocket on said shaft, an elongated flexible drive-transmitting member trained about said shafts, and tensioning means for maintaining said member tensioned irrespective of the width of said gap.

6. An arrangement as defined in claim 5; further comprising an additional shaft mounting the other of said rollers for rotation, and on additional driven sprocket; and wherein said member is trained also about said additional sprocket.

7. An arrangement for processing bands of synthetic plastic material in deformable state, comprising a pair of cooperating rollers mounted for rotation about at least substantially parallel axes and having respective circumferential surfaces defining with one another a gap through which the bands are to pass; drive means for driving at least one of said rollers in rotation; varying means for periodically varying the width of said gap, including a shaft extending through one of said rollers and mounted for eccentric movement relative to the axis associated with said one roller, and cam means operated for controlling the periodicity of such eccentric movement; and a stub shaft extending through and mounting said shaft for rotation.

* * * * *